H. A. KOSTER.
DETACHABLE SPOUT FOR BARRELS.
APPLICATION FILED FEB. 12, 1917.
1,248,136.
Patented Nov. 27, 1917.
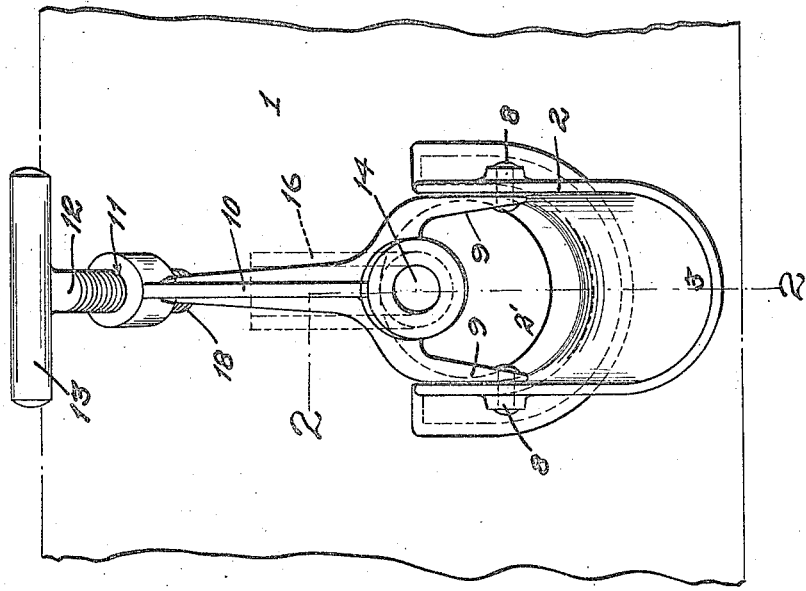
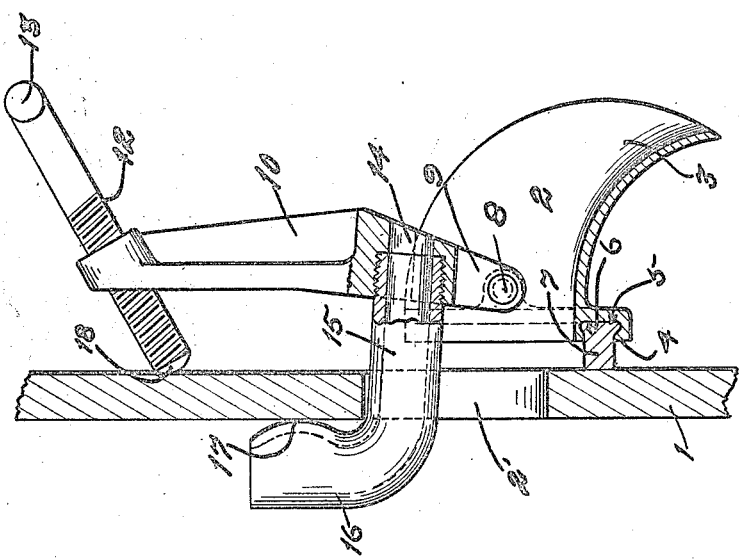
WITNESS
INVENTOR.
BY
ATTORNEYS

UNITED STATES PATENT OFFICE.

HENRY A. KOSTER, OF SAN FRANCISCO, CALIFORNIA.

DETACHABLE SPOUT FOR BARRELS.

1,248,136.

Specification of Letters Patent.   Patented Nov. 27, 1917.

Application filed February 12, 1917.   Serial No. 148,093.

*To all whom it may concern:*

Be it known that I, HENRY A. KOSTER, a citizen of the United States, residing at the city and county of San Francisco and State of California, have invented certain new and useful Improvements in Detachable Spouts for Barrels, of which the following is a specification.

The present invention relates to an improved spout or outlet adapted for attachment to a fluid containing barrel or receptacle adjacent the outlet or bung-hole thereof to direct the contents discharging from the opening a distance from the wall surface of the barrel or receptacle.

The invention has for its principal objects to provide a spout or outlet capable of being easily and quickly detachably secured to a barrel or receptacle adjacent the bung-hole thereof; one provided with an adjustable means for engaging the receptacle to clamp the spout in position, thereby dispensing with the necessity of nails or other means liable to perforate the wall of the receptacle in securing a spout thereto. To provide a means for admitting of the entering of air into a closed receptacle or barrel through the outlet or bung-hole opening thereof to permit the ready flow of the contents from the barrel.

With the above mentioned and other objects in view, the invention consists in the novel construction and combination of parts hereinafter described, illustrated in the accompanying drawings and pointed out in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in elevation of the preferred embodiment of my invention in position relative to the outlet of a container.

Fig. 2 is a vertical broken sectional view taken on the line 2—2 of Fig. 1.

Referring more particularly to the several views of the drawings, wherein like characters of reference designate corresponding parts, 1 indicates the wall of a barrel or other suitable receptacle which is closed with the exception of the bung-hole or outlet 2', provided in the wall thereof. 2 is a suitable spout or outlet curved downwardly as at 3 at its forward end, and said spout is preferably troughed or U-shaped in cross section. The rear wall 4 of the spout is adapted to lie parallel with the outer surface of the wall 1, and is provided with a suitable headed recess 5 in which is seated the headed portion 6 of a suitable sealing gasket 7, preferably of rubber, and which is adapted to be forced into contact with the wall 1 when the spout is secured in position, in a hereinafter described manner.

Pivotally connected as at 8 to the side walls of the spout are the forked lower ends 9 of a lever 10. The lever is provided at its upper end with a threaded opening 11 extending angularly therethrough, and operating in said opening is a clamping screw 12 having a handle 13. The end of said screw is adapted to impinge against the outer face of the receptacle wall 1, as in Fig. 2 of the drawings.

The lever 10 is formed at its lower end with a transverse vent 14 into which is threaded one end of a vent pipe 15 curved at its outer end, as at 16, and provided with the bowed or fulcrumed portion 17.

In placing the structure in position, the curved end 16 of the vent 15 is inserted through the opening or outlet 2' and is held with the bowed or fulcrumed portion 17 in contact with the inner wall surface of the receptacle above the opening or outlet 2'. The screw 12 is then adjusted to force the inner end 18 thereof tightly in contact with the exterior surface of the receptacle wall which action forces the packing 7 into contact with the outer surface of the receptacle, as in the drawings. When in this position, the air to admit of the displacement of the contents of the receptacle is admitted thereinto through the vent 14 and pipe 15, it being released into the receptacle at a point above the top wall of the opening. The admitting of the air permits of a free flow of the contents from the opening or outlet 2'.

It will be apparent that I have provided a discharge spout which is capable of being readily attached to a barrel or receptacle through the bung-hole thereof, and have also provided a vent adapted to extend through the barrel to admit of the entrance of air into the barrel at a point above the wall of the bung-hole, thereby enabling a free flow of the contents therefrom.

Having thus described my invention, what I claim is:—

1. A discharge spout for detachable attachment to a barrel through the bung-hole thereof, the same comprising a spout portion, the rear wall of which is adapted for lying in frictional contact with the outer surface of the barrel adjacent the bung-hole, a lever pivotally connected to the spout on an axis parallel with the outer surface of the barrel, an adjustable means carried by the lever for engaging the outer surface of the barrel, and a fulcrum member extending from the lever intermediate the pivotal connection of the lever, and the adjustable means, said fulcrum member adapted for extending through the bung-hole of the barrel and for contacting with the inner wall surface of the same.

2. A discharge spout for detachable attachment to a barrel through the bung-hole thereof, the same comprising a spout portion, the rear wall of which is adapted for lying in frictional contact with the outer surface of the barrel adjacent the bung-hole thereof, a lever pivotally connected to the spout on an axis parallel with the outer surface of the barrel, an adjustable means carried by the lever for engaging the outer surface of the barrel, and an open ended tubular vent member extending from the lever intermediate the spout and the adjustable means, said vent being bent upwardly at its inner end and adapted to contact with the inner surface of the barrel above the bung-hole therein.

3. A discharge spout for detachable attachment to a barrel through the bung-hole thereof, the same comprising a spout portion, a packing member carried by the rear wall thereof and adapted to be forced into contact with the outer surface of the barrel adjacent said bung hole, a lever pivotally connected at its lower end to said spout to swing on an axis parallel with the rear wall of the spout, and an adjusting screw threaded to the outer end of said lever and adapted for engaging the outer surface of the barrel, an open ended tubular vent extending at substantially right angles from the lever intermediate the pivoted connection of the lever and said adjusting screw, said vent being upwardly bent at its inner end to lie parallel with said lever and providing a fulcrum for contact with the inner surface of the barrel intermediate said adjusting screw and packing.

In testimony whereof I have signed my name to this specification in the presence of the subscribing witness.

HENRY A. KOSTER.

Witness:
   D. B. RICHARDS.

Copies of this patent may be obtained for five cents each, by addressing the "Commissioner of Patents, Washington, D. C."